(12) United States Patent
Toon

(10) Patent No.: US 8,240,727 B2
(45) Date of Patent: Aug. 14, 2012

(54) HOOK

(75) Inventor: John Toon, Aberdeen (GB)

(73) Assignee: Nautilus Rigging LLP, Aberdeenshire (GB)

( * ) Notice: Subject to any disclaimer, the term of this patent is extended or adjusted under 35 U.S.C. 154(b) by 7 days.

(21) Appl. No.: 12/863,806

(22) PCT Filed: Jan. 23, 2009

(86) PCT No.: PCT/GB2009/050057
§ 371 (c)(1),
(2), (4) Date: Jul. 21, 2010

(87) PCT Pub. No.: WO2009/093074
PCT Pub. Date: Jul. 30, 2009

(65) Prior Publication Data
US 2010/0289284 A1  Nov. 18, 2010

(30) Foreign Application Priority Data
Jan. 24, 2008  (GB) .................................. 0801282.5

(51) Int. Cl.
*B66C 1/36* (2006.01)
(52) U.S. Cl. .................. 294/82.21; 294/82.19
(58) Field of Classification Search .................. 294/82.1, 294/82.17, 82.19, 82.2; 24/598.9, 599.5, 24/599.8, 600.1, 600.2
See application file for complete search history.

(56) References Cited

U.S. PATENT DOCUMENTS

| | | | | |
|---|---|---|---|---|
| 1,193,516 A * | 8/1916 | Clarke | .......................... | 294/82.2 |
| 1,390,023 A * | 9/1921 | Coon | .......................... | 294/82.21 |
| 1,505,051 A * | 8/1924 | Lindgren | .................... | 294/82.21 |
| 1,554,303 A * | 9/1925 | Smith | .......................... | 294/82.2 |
| 1,605,853 A * | 11/1926 | Bannon | ...................... | 294/82.17 |
| 1,618,321 A * | 2/1927 | Woods | ........................ | 294/82.21 |
| 1,687,006 A * | 10/1928 | Cornelius | .................... | 294/82.2 |
| 1,956,786 A * | 5/1934 | Bemis | ........................ | 294/82.21 |
| 2,493,282 A * | 1/1950 | Criswell | ...................... | 294/82.1 |
| 3,899,806 A * | 8/1975 | Berg | .......................... | 294/82.19 |
| 3,940,173 A * | 2/1976 | Ulbing | ........................ | 294/82.21 |
| 4,073,042 A * | 2/1978 | Miller | ........................ | 294/82.19 |
| 4,293,156 A * | 10/1981 | Chapalain | .................. | 294/82.21 |
| 4,309,052 A * | 1/1982 | Drayton | ...................... | 294/82.2 |
| 5,727,834 A * | 3/1998 | Weselowski | ............... | 294/82.19 |

* cited by examiner

*Primary Examiner* — Paul T Chin
(74) *Attorney, Agent, or Firm* — Hultquist PLLC; David S. Bradin; Steven J. Hultquist

(57) ABSTRACT

The invention relates to a hook (10), which may for example be used with a crane to lift heavy loads. In one embodiment, the hook may have a load-bearing portion (12) and an arm portion (14) where the arm portion can pivot relative to the load-bearing portion between open and closed configurations and may have a locking mechanism (20, 21, 29, 30, 32) that can lock the arm portion with respect to the load-bearing portion in the open configuration of the hook, in which configuration the arm portion and the load-bearing portion together define a discontinuous boundary. The hook may also be provided with a suspension portion (74), and the suspension portion, the load-bearing portion and the arm portion may be pivotally coupled with respect to each other.

15 Claims, 9 Drawing Sheets

HOOK

CROSS-REFERENCE TO RELATED APPLICATIONS

This application is a U.S. national phase application under the provisions of 35 U.S.C. §371 of International Application No. PCT/GB09/50057 filed Jan. 23, 2009, which in turn claims priority of United Kingdom Patent Application No. 0801282.5 filed Jan. 24, 2008. The disclosures of such international application and United Kingdom priority application are hereby incorporated herein by reference in their respective entireties, for all purposes.

The present invention provides a hook for lifting a load. In particular, but not exclusively, it relates to general lifting hooks adapted to be used with a crane, or attached to a main crane hook. In certain embodiments, the hook may be used for selectively attaching loads to lifting equipment for the transportation of the loads from one location to another, and may be configured for facilitating safe handling by operators, particularly offshore.

Loads are typically attached to chains or located in containers or slings having tabs to facilitate moving them from one location to another. In order to move such loads, cranes or other lifting devices can be employed, and are typically fitted with a lifting hook appropriate for the particular load application. For example, when a crane is used, a "general" lifting hook may optionally be attached to the master crane hook via an extension of wire or a chain extending from a suspension device in the general lifting hook, and the general lifting hook can be manipulated at the work site into a position to attach to the load to be lifted. This can be useful in the offshore oil and gas industry where difficult operational conditions persist on floating vessels or installations. In such offshore operations, a wire connection is typically used to connect the lifting hook to the lifting device to avoid cyclic swinging of components suspended from the crane above the hook.

Conventional lifting hooks such as those used with cranes for lifting heavy loads in a vertical operation have a load-bearing portion and an arm portion pivotally coupled to one another. The arm portion is pivotable relative to the load-bearing portion to thereby create a hook opening through which the tabs or chains or lifting rings can be inserted or removed. The load-bearing and arm portions can provide a continuous boundary defining an eye, within which one or more tabs or chains coupled to the load are accommodated. In use, an operator will typically open the hook and guide the tabs or chains on and off the load-bearing portion. As a result of this arrangement, pinch and trap injuries may be suffered by operators handling existing hooks.

According to a first aspect of the present invention there is provided a hook comprising a load-bearing portion, an arm portion and a suspension portion from which the hook is suspensible in use, wherein the load-bearing portion and the arm portion are movable between a closed configuration, in which the load-bearing portion and the arm portion form a substantially continuous boundary, and an open configuration, in which the arm portion and the load-bearing portion do not define a continuous boundary, and wherein the load-bearing portion, arm portion and suspension portions are selectively pivotable relative to one another.

The load-bearing portion, arm portion and suspension portion can each be pivotable about a common pivot axis.

The load-bearing, arm and suspension portions can be connected via a connection means defining a central pivot axis about which each of the load-bearing, arm and suspension portions are selectively pivotable. The load-bearing, arm and suspension portions can each have an opening that accepts the connection means. The connection means can be a connecting pin.

The hook can further comprise a locking mechanism for locking the arm portion and the load-bearing portion in a locking position in which relative movement of the load-bearing portion and the arm portion is substantially restricted. The locking mechanism may have a locking device that is actuable between a locked position in which relative movement of the load-bearing and arm portions is substantially restricted and an unlocked position, in which relative movement of the load-bearing and arm portions is permitted.

In the locked position, the suspension portion and the locked arm and load-bearing portions are pivotable relative to one another.

The locking mechanism can lock the arm portion and the load-bearing portion in the open configuration.

According to a second aspect of the present invention there is provided a hook comprising: a load-bearing portion; an arm portion pivotally coupled to the load-bearing portion such that the arm portion is pivotable relative to the load-bearing portion between a closed configuration, in which the load-bearing portion and the arm portion together define a substantially continuous boundary, and an open configuration, in which the arm portion and the load-bearing portion together define a discontinuous boundary; and a locking mechanism adapted to lock the arm portion with respect to the load-bearing portion in the open configuration of the hook.

Typically, the hook further includes a suspension portion pivotally coupled to the load-bearing portion and/or the arm portion. More specifically, the load-bearing portion, the arm portion and the suspension portion may be arranged to be independently rotatable with respect to each other. Further, the load-bearing portion, the arm portion and the suspension portion may be coupled to and/or be rotatable on a connecting pin, e.g. a pivot pin. In addition, when the hook is suspended in use via the suspension portion from e.g. a lifting apparatus, the load-bearing portion and the arm portion are allowed to rotate with respect to the suspension portion when the load-bearing portion and the arm portion are locked in the open configuration of the hook, to a position suitable for attaching a load to and/or disengaging a load from the hook. The suspension portion and arm portion may be adapted to interengage to limit the range of rotation of the arm portion with respect to the suspension portion and/or to facilitate holding the arm portion in fixed relation to the suspension portion when pivoting the load-bearing portion relative to the arm portion in use.

The locking mechanism can be actuable to lock the arm portion and the load-bearing portion with respect to each other in the closed configuration.

The locking mechanism may be adapted to lock the arm portion with respect to the load-bearing portion, in one or more discrete open positions of the open configuration of the hook, for example corresponding to different angles of opening.

The locking mechanism may include a locking device arranged to adopt a locked position to lock the arm with respect to the load bearing portion. In the locked position, the arm portion may be restrained from movement relative to the load-bearing portion. The locking device may be arranged to adopt an unlocked position, in which the arm portion is free to be pivoted relative to the load-bearing portion, for moving the arm portion into different open positions or configurations of the hook. In the unlocked position, the locking device can allow selective movement of the load-bearing portion relative to the arm portion.

Typically, the arm portion may be moved to different arm locking positions in which the arm portion is lockable with respect to the load-bearing portion via the locking device. In such arm locking positions, the locking device may be moved from a locked position to an unlocked position, as required. Between arm locking positions, the locking device may be prevented from moving to a locked position. The locking positions may be located at different pivot angles. The locking device may comprise a locking pin.

The hook can further comprise a suspension portion from which the hook may be suspended in use. The suspension portion may be pivotally coupled to the load-bearing portion and/or the arm portion. Thus, the suspension portion, the arm portion and/or the load-bearing portion can be independently pivotable relative to each other, for example, where the locking device has adopted an unlocked position.

The load-bearing portion, arm portion and suspension portion may be aligned on a common pivot axis, and each can be adapted to be rotated or be pivotable about the common pivot axis.

The arm portion may be adapted to move under gravity between the open configuration of the hook and the closed configuration. Thus, the arm may move under gravity to close a hook opening. Optionally, the arm portion may be adapted to close against the load-bearing portion by a spring, which may be arranged to act against the arm portion, load-bearing portion and/or suspension portion for moving the arm. Such a spring arrangement is especially useful when the hook is used in situations where gravity alone is not sufficient to close arm against the load-bearing portion.

The pivot axis may be substantially perpendicular to a longitudinal axis of the hook. The hook may include a connecting pin or pivot pin provided through the arm portion, the load-bearing portion and the suspension portion, the pin defining the pivot axis.

The provision of three separate independently pivotable parts allows the load-bearing portion and the arm portion of the hook to be movable relative to the suspension portion in the locked position. Thus, in use, the arm portion and the load-bearing portion may pivot together relative to the suspension portion when the arm portion is locked with respect to the load-bearing portion.

According to either aspect of the invention, optionally the locking mechanism can lock the arm portion and the load-bearing portion in one or more different positions in the open configuration.

The hook and/or locking mechanism can be provided with an actuator arranged or operable to facilitate movement of a locking device between the locked and unlocked positions. The actuator can be arranged to facilitate actuation of the locking device and/or locking mechanism by an operator.

The locking mechanism can comprise first and second selectively interengagable locking parts. The locking mechanism may include a locking device, such as a locking pin. The first and second selectively interengagable locking parts of the locking mechanism may be adapted to retain the hook, locking mechanism and/or the locking device in locked or unlocked positions. One of the first and second interengagable locking parts can be located on the arm portion and the other locking part can be located on the load-bearing portion. The locking mechanism may include a resilient means to bias the first interengagable locking part into engagement with the second interengagable locking part. In this way, the locking device can be biased into the locking position.

The first selectively interengagable locking part can comprise at least one recess or notch. The second selectively interengagable locking part can comprise a movable protrusion that is accommodated or adapted to be received in the at least one recess, in an interference fit, e.g., where an end of the protrusion extends at least part way into the recess to obstruct relative movement. The protrusion can be movable into and out of engagement with the recess, and may be in the form of a locking pin. The first interengagable locking part may have first and second recesses each recess adapted to receive selectively an end of a locking pin of the second selectively interengagable locking part. The locking mechanism can be provided with a resilient means to bias the protrusion into engagement with the at least one recess.

The load-bearing portion can be provided with a protrusion in the form of a locking pin. The arm portion can be provided with a first recess for accommodating an end of the locking pin in the open configuration. The arm portion can be provided with a second recess for accommodating an end of the locking pin in the closed configuration.

The angle between the first recess and the second recess can be less than 90°. The angle between the first and the second recess can be less than 75°. The angle between the first and the second recess can be around 65°.

The locking pin can be biased by a resilient means towards the arm portion. The pin and the resilient means can be enclosed by and movable within a protective sheath. The resilient means can comprise a tension spring.

The actuator can be coupled to the protrusion to facilitate movement of the protrusion into and out of engagement with the at least one recess. According to the embodiment where the protrusion is a locking pin, the actuator can be actuable to cause axial movement of the locking pin along its longitudinal axis. The actuator can be operable to move the pin against the bias of the resilient means.

The actuator can be operable to move the pin into and out of engagement of the first recess of the arm portion. The actuator can be operable to move the pin into and out of engagement of the second recess of the arm portion.

The longitudinal axis of the locking pin can be substantially perpendicular to a pivot axis defined by the pivotal coupling between the load-bearing portion and the arm portion.

The actuator can extend outwardly relative to the longitudinal axis of the locking pin. The actuator can extend outwardly at an angle of between 20 and 60° relative to the longitudinal axis of the locking pin. The actuator can extend outwardly at an angle of around 35° relative to the longitudinal axis of the locking pin.

The actuator can be provided with an outer gripping surface to improve an operator's purchase on the actuator. The outer gripping surface can comprise a ribbed portion on an external surface of the actuator to enhance grip.

The suspension portion can comprise a first part that is pivotally coupled to the arm and load-bearing portions and a second part that is rotatable relative to the first part. The first and second parts can be coupled by means of a swivel bearing. Thus, the second part may be adapted to swivel axially relative to the first part about a longitudinal axis of the suspension portion.

The suspension portion can be provided with a second part in the form of an attachment region, such as an attachment ring or eyelet, which allows attachment of the hook to a suspending means in use, such as a chain or wire carried by a crane, a winch, and/or other lifting device. The suspension portion allows the hook to be suspended in use.

Suspension of the hook from the suspension portion in use may define the longitudinal hook axis. The longitudinal axis of the suspension portion may be parallel or coincident with or may the longitudinal axis of the hook.

An inner surface of the load-bearing portion can be shaped to locate the load in a load-bearing area. The load-bearing area is preferably aligned with the longitudinal axis of the hook in use. This improves stability by reducing the tendency of the hook to tip or tilt.

The inner surface of the load-bearing portion can have the greatest radius of curvature in the load-bearing area to ensure that the load is concentrated at this point. The inner surface of the load-bearing portion can have a steep sided region located on at least one side of the load-bearing area. The inner surface may define opposed side portions extending substantially in parallel from near the load-bearing area to near the arm portion of the hook or to near a free end or hook opening end of the load-bearing portion.

The inner surface of the load-bearing portion between the pivotal connection of the arm and load-bearing portions, and the load-bearing area, can be shaped to have the steepest sides and the lowest radius of curvature. This ensures that loads are urged towards the load-bearing area.

The inner surface of the load-bearing portion can be shaped to facilitate removal and insertion of the load into the load-bearing portion. The inner surface of the load-bearing portion between the load-bearing area and the free end of the load-bearing portion can have relatively steep sides and a radius of curvature that gradually increases towards the load-bearing area. This gently increasing radius of curvature facilitates insertion and removal of loads from the hook.

The load-bearing portion may be pivotable into a loading orientation in the open configuration where an inner surface of the load-bearing portion is presented at an angle to facilitate urging a load toward a load-bearing area of the load-bearing portion in use.

The hook can comprise a handle coupled to the load-bearing portion. The handle may define an area separate from the load-bearing portion. The area defined by the handle can have a continuous boundary. The handle can be contiguous with an outer part of the load-bearing portion. An outer surface of the handle is smoothly contoured, and joins smoothly to an outer surface of the load-bearing portion, e.g. toward upper and lower ends of the hook in use. The handle and the load-bearing portion can be integral. The actuator can be operable within the area defined by the handle. The handle is configured to protect and/or shield the actuator and/or the locking mechanism. The handle provides a housing for at least part enclosing the actuator and/or locking pin. The handle defines a void or recessed portion adapted to receive the actuator and or locking mechanism. The recessed portion/void may be defined between the handle portion and the load-bearing portion. The outer surface of the handle and/or the load-bearing portion may be wider than the actuator to facilitate shielding the actuator from external impacts. The actuator may be slidably mounted in the recessed portion and/or void.

The arm portion and the load-bearing portion may define a first aperture, for example a hook eye, adapted to receive a connecting load tab or chain or lifting ring therethrough, and a second aperture may be defined by the handle and/or the load-bearing portion. More specifically, the second aperture may be defined between the handle and the load-bearing portion. The second aperture may be separate from the first aperture. The first and second apertures may be separated by a section of the load-bearing portion. The second aperture is adapted to receive the fingers of an operator therethrough for holding the handle. The second aperture may include the void or recessed portion.

Typically the actuator can be located on an opposing side of the hook from the region of the hook opening between the load-bearing and arm portions. The handle may extend radially away from a longitudinal axis of the hook to facilitate pivoting of the load-bearing portion under the influence of gravity, in use, for example to move it into a loading orientation. The hook may include a recessed region which may be separate from the first and/or second aperture(s) of the hook. The recessed region may be defined between a portion of the handle and the load-bearing portion, and may be within the area defined by the handle.

In certain embodiments, the actuator can be protected from the opening by a shield. The shield can comprise part of the handle and/or the load-bearing portion. The actuator can be retained within the area defined by the handle. As a result, the risk of pinch or trap injuries from a person using the actuator to actuate the locking device and/or locking mechanism is greatly reduced.

The actuator and/or other components of the locking mechanism can be located in the recessed region of the hook, such that the actuator and/or said other components do not extend beyond an outer profile of the hook. Thus, the risk of accidental actuation in use is greatly reduced. The actuator may be selectively operable by a user, e.g., when holding the handle, to activate the locking mechanism, e.g. to move a locking device to the locking position, and thereby lock the arm portion with respect to the load-bearing portion.

The load-bearing portion can be adapted to carry a load of up to around 22 tonnes. The load-bearing portion can be adapted to carry a load of up to around 8 tonnes. In another embodiment, the hook is rated to carry loads of up to around 15 tonnes.

The hook can be a crane hook.

The hook and/or components of the hook, such as the individual arm, load-bearing and/or suspension portions, may be formed from a metal and/or plastics material. The metal may be an alloy such as steel. For example, the metal may be a high grade alloy steel which may be resistant to fatigue and strain when subjected to loads.

The hook may be provided with test nipples or other markers for measuring divergence of the hook from its original configuration, and/or assessing fatigue and/or strain.

Further features of the second aspect may be defined with reference to features of the first aspect of the invention, where appropriate.

According to a third aspect of the present invention there is provided a hook comprising a load bearing portion and an arm portion pivotally coupled to the load bearing portion such that the arm portion and the load boarding portion are pivotable relative to one another between a closed configuration, in which the load bearing portion and the arm portion form a substantially continuous boundary, and an open configuration, in which the arm portion and the load bearing portion do not define a continuous boundary, the hook further comprising a locking device for locking the arm portion and the load bearing portion in the open configuration.

The locking device can also be actuable to lock the arm portion and the load bearing portion in the closed configuration. In the unlocked position (i.e. between the locking positions in the open and closed configurations), the locking device can allow selective movement of the load bearing portion relative to the arm portion.

The hook can further comprise a suspension portion from which the hook is suspensible in use. The suspension portion, the arm portion and the load bearing portion can be pivotable relative to one another.

Further features of the third aspect may be defined with reference to features of the first and/or second aspect(s) of the invention, where appropriate.

Embodiments of the present invention will now be described with reference to the accompanying Figures, in which:—

Figure 1:
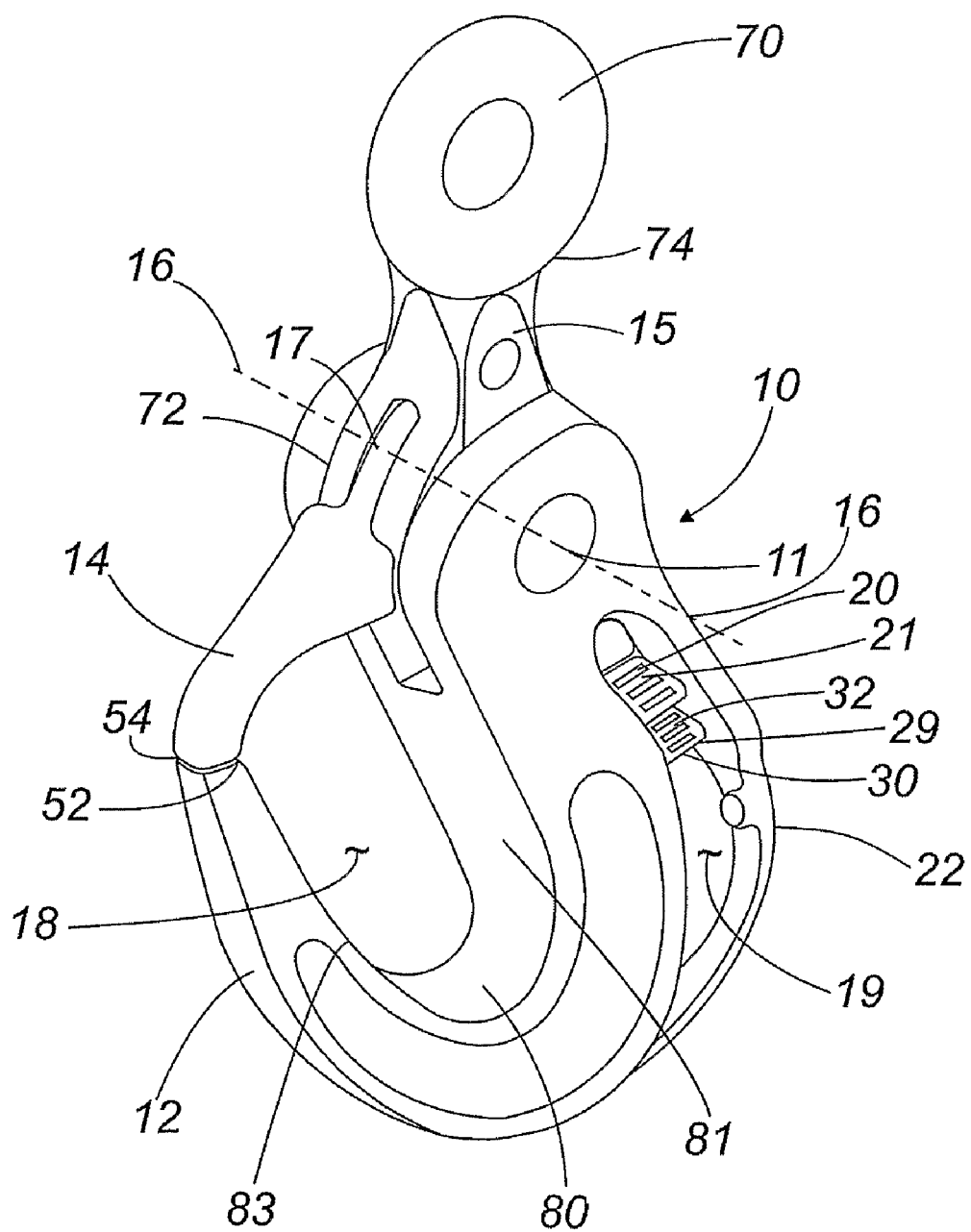
FIG. 1 is a perspective view of a hook in a closed configuration.

A hook is shown generally at 10 in FIG. 1. The hook comprises a load-bearing portion 12 and an arm portion 14 pivotally mounted with respect to one another about a pin 11. The arm portion 14 and the load-bearing portion 12 are movable between a closed configuration and an open configuration of the hook. The hook is shown in a closed configuration in FIG. 1, in which an end face 54 of the arm portion 14 and an end face 52 of the load-bearing portion 12 abut and are parallel to one another such that the arm portion 14 and the load-bearing portion 12 define an eye 18 having a continuous boundary. In an open configuration, referred to in further detail below, the end faces 52, 54 are separated to form a hook opening such that a load can be provided to the load-bearing portion of the hook, the arm portion and load-bearing portion in that case defining a discontinuous boundary. The boundary in the closed (and open) positions extends around the eye 18 of the hook 10, and the load-bearing portion 12 is designed to receive a chain or tab of a load (not shown) through the eye 18 so that it is urged against the load-bearing portion 12 in its load-bearing area 80.

The hook 10 is also provided with a suspension portion 74 which is arranged to attach the hook 10, including the load-bearing portion 12 and arm portion 14, to a crane (not shown) or other lifting device via an intermediate connecting chain or wire (constituting a suspension means) (not shown). The suspension portion 74 has a yoke 72 at one end extending via a neck 15 to an eyelet 70 at the other, top end of the suspension portion. This eyelet 70 allows the hook to be attached to the connecting chain or wire for connecting to and suspending the hook from a crane. The yoke 72 of the suspension portion attaches to the arm portion 14 and the load-bearing portion 12 at the pin 11. More specifically, the arm portion 14, load-bearing portion 12 and suspension portion 74 are all coupled by the pin 11 having its longitudinal axis defining and being aligned with the pivot axis 16. The pin 11 has splayed ends to retain the arm portion 14, the load-bearing portion 12 and the suspension portion 74 in adjacent relation. In this way, each of the arm portion 14, load-bearing portion 12 and suspension portion 74 can pivot independently from one another about the pivot axis 16 on the common pin 11.

Figure 2:
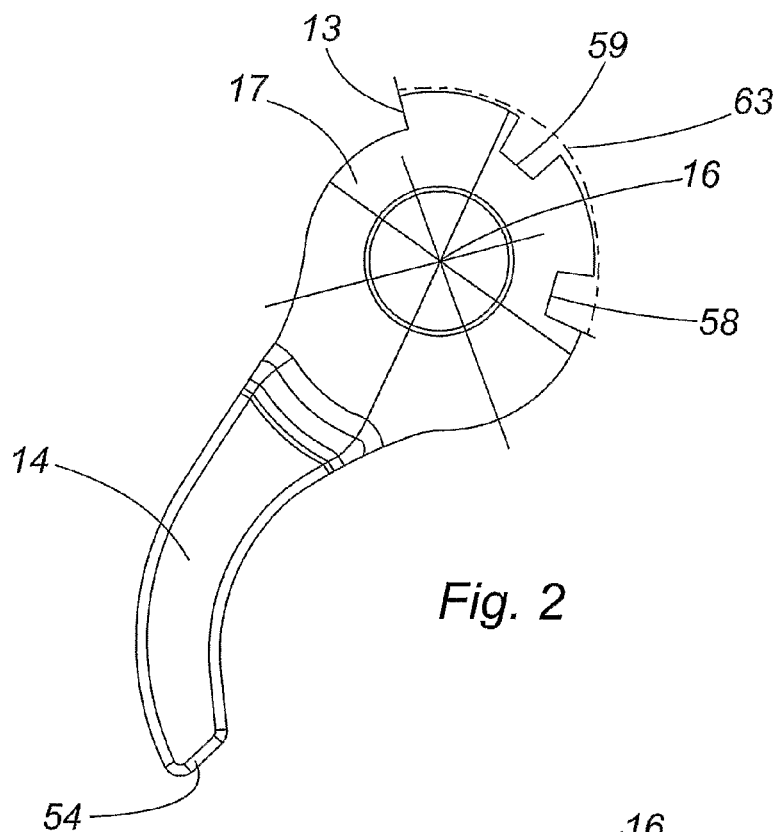
FIG. 2 is a side view of an arm portion of the FIG. 1 hook.

The arm portion 14 is also arranged to be locked with respect to the load-bearing portion 12 both in the open and closed configurations of the hook 10, by way of a locking mechanism 90 as described now with further reference to the drawings. More specifically with reference to FIG. 2, toward a distal end of the arm portion 14, distal from the end face 54, the arm portion has an annular part 17 having substantially planar side faces. The circular hole in the annular end 17 is adapted to be aligned with the pivot axis 16 and allows the pin 11 to be received therethrough to couple together the arm portion 14, the yoke 72 of the suspension portion 74 and the load-bearing portion 12. The distal end of the arm portion 14 has a first notch 59 and a second notch 58 which are cut away from the circumference of the annular part 17 of the arm portion 14 (constituting a first part of the locking mechanism). The first notch 59 is circumferentially spaced from the second notch 58 by around 65°.

Figure 4:
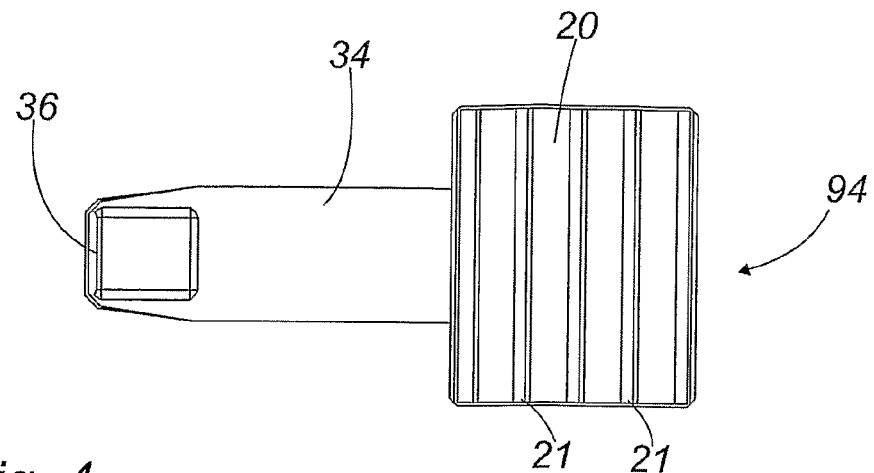
FIGS. 4 and 5 are side views of parts of a locking pin assembly and an actuator of the locking mechanism of the FIG. 1 hook.
Figure 5:
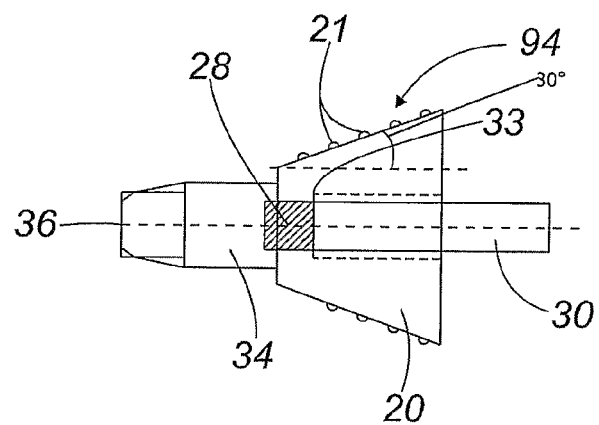
Figure 14:
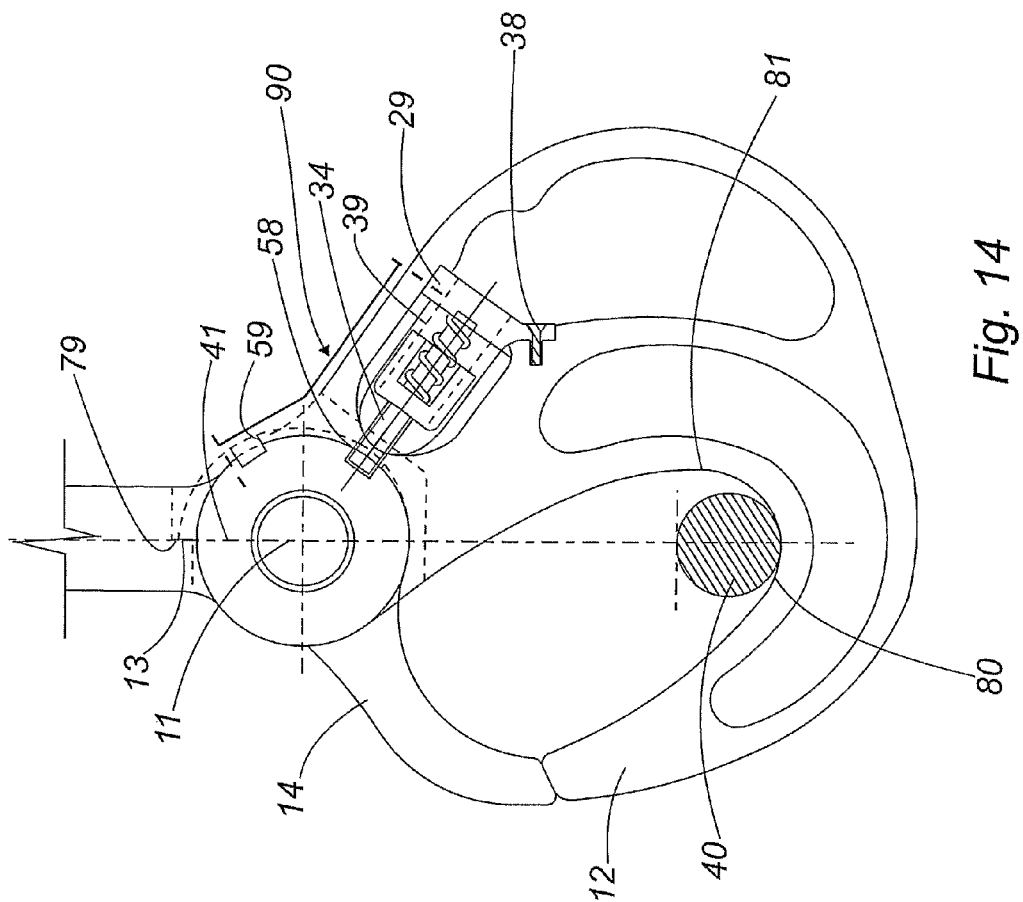
FIGS. 13 and 14 are front and side views respectively of the FIG. 1 hook in a closed configuration.
Figure 15:
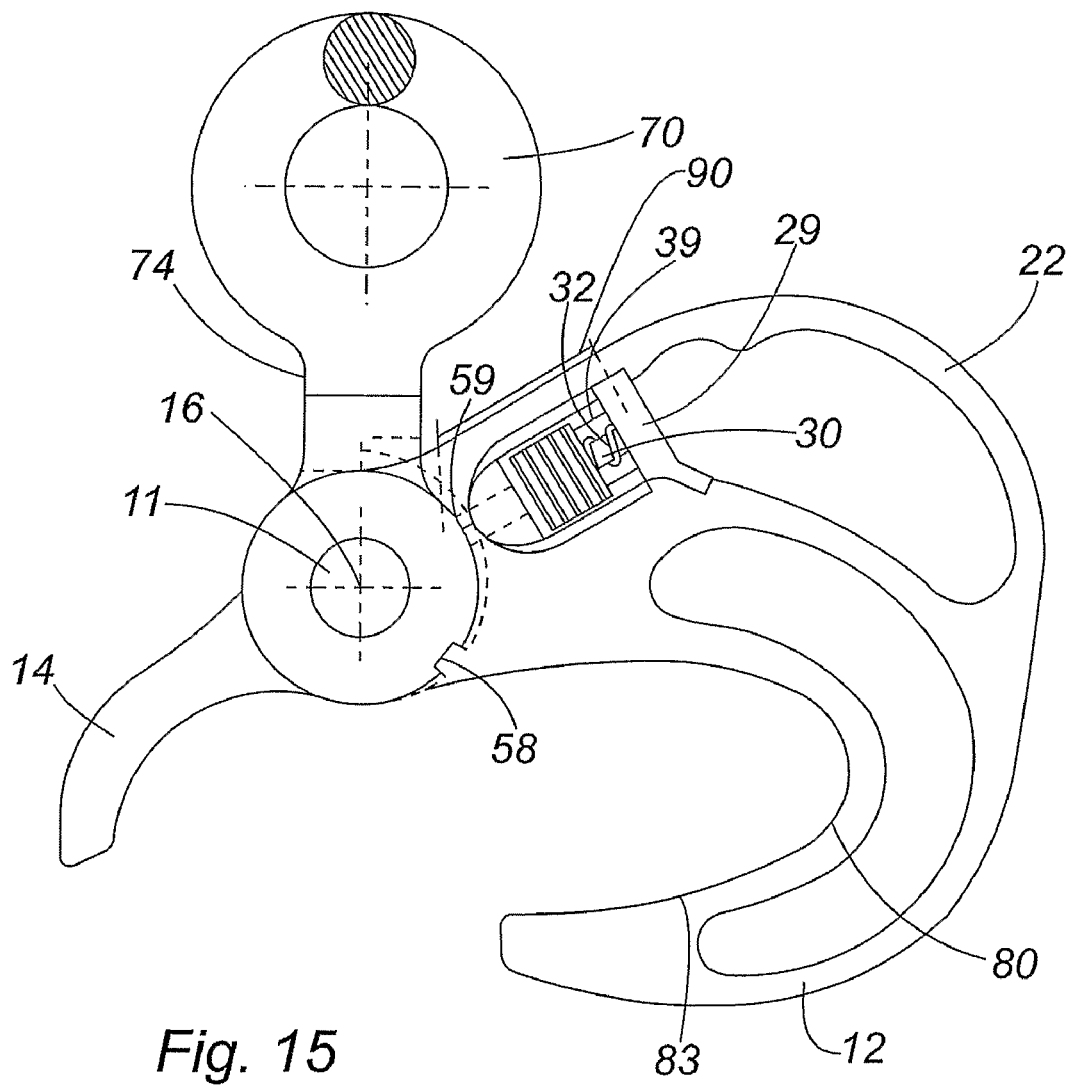
FIG. 15 is a side view of the FIG. 1 hook in a locked open configuration.

A locking pin 94 (constituting a second part of the locking mechanism) is shown in FIG. 4 and FIG. 5. The locking pin 94 has a first shaft 34 having a tapered end 36 and toward another end to the shaft 34 is provided with an actuator 20. When assembled, the locking pin 94 is mounted to the load-bearing portion 12 and is arranged to engage with one of the notches 58,59 of the arm portion to lock the arm from movement rotationally with respect to the load-bearing portion, i.e., in a locking position in the open or closed configurations of the hook. In FIG. 14, the locking pin 94 is engaged with the notch 58 in the closed configuration of the hook. In FIG. 15, the locking pin 94 is shown in a second, locked open position of the hook, where the pin 94 is engaged with the notch 59 of the arm portion.

Figure 9:
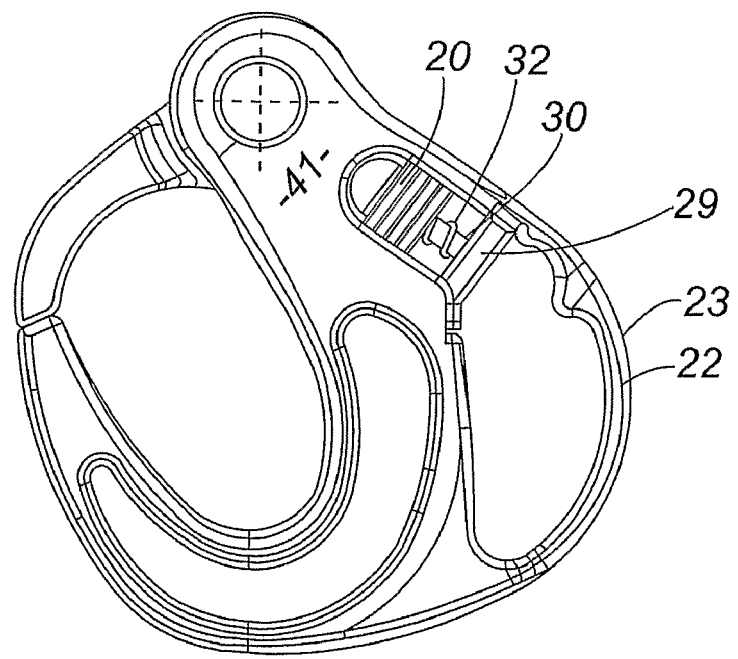
Figures 11, 12:
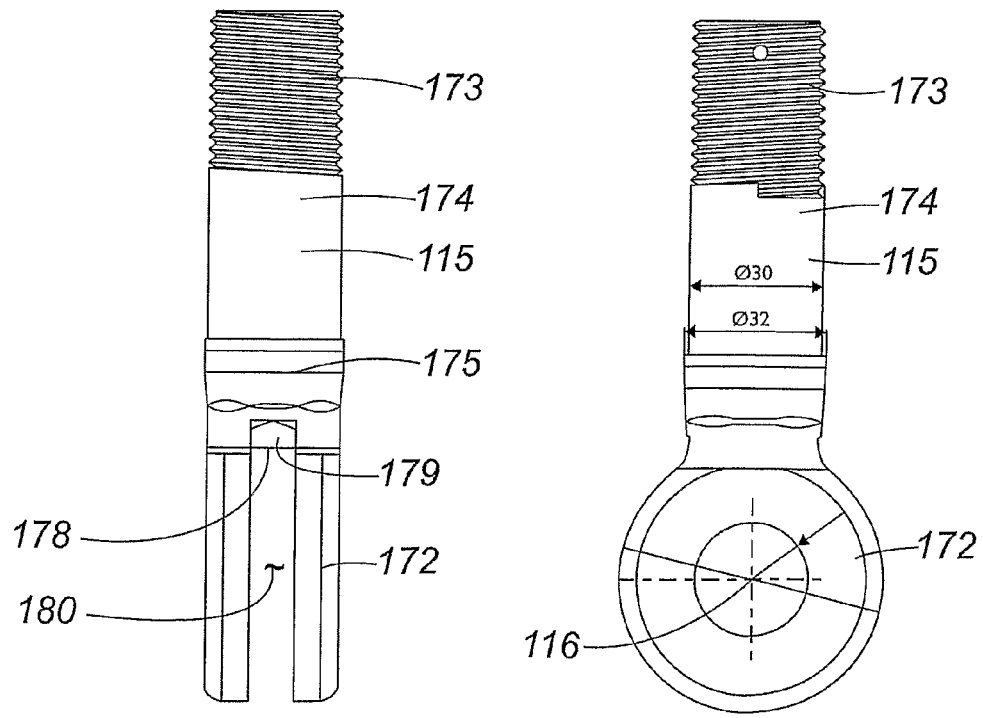
FIGS. 11 and 12 are side and front views respectively of an attachment for attaching the load-bearing and arm portions to the eyelet of FIG. 10.
Figure 13:
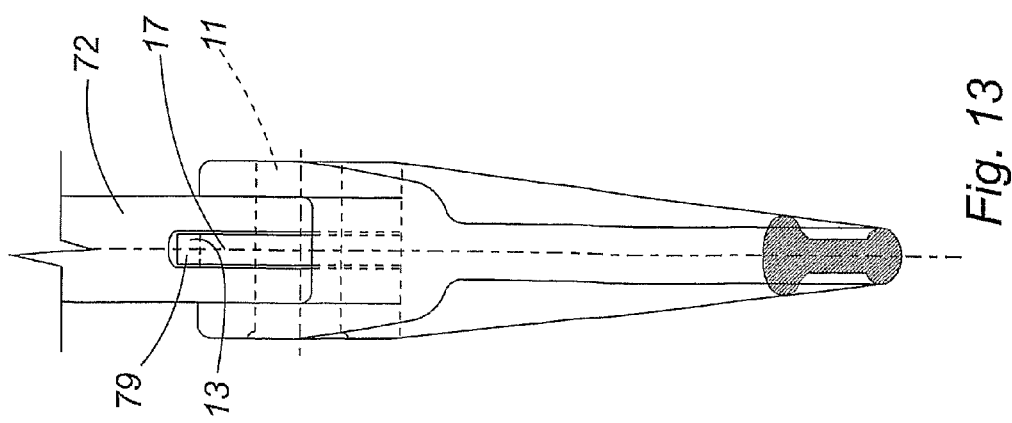

In further detail, a spring 32 is fitted to the locking pin 94 and is held in tension between a end stop piece 29 which is used to retain the locking pin 94 in position on the load-bearing portion 12, and the actuator as can be seen with reference for example to FIG. 9 or FIG. 15. The tension spring 32 is coiled around the exterior of a second shaft 30, the spring and shaft 30 both provided to the locking pin 94 prior to assembly so that the tension spring 32 can extend between the end stop 29 and an annular step 33 in the cylindrical internal chamber 28 formed in the actuator 20 (see FIG. 5). The actuator 20 and first and second shafts 30, 34 are fixed to one another and move as a single assembly. Thus, the locking pin 94 is moveable relative to the shaft 30, and the tension spring 32 surrounding the shaft 30 can thereby bias the locking pin 94 towards the arm portion 14 of the hook 10 in use, and the tapered leading end 36 of the pin 94 can locate in the notches 58, 59 of the arm portion 14 as shown in FIGS. 12 and 13 when the hook 10 is in one of its locking positions. The action of the spring urges the locking pin 94 against the annular part 17 of the arm portion, and so acts to keep the pin in engagement with the notches 58, 59 to lock the arm portion in the positions of FIGS. 15 and 16.

In more detail, the actuator 20 has two divergent opposing sides that extend outwardly at an angle of around 30° from a longitudinal axis of the pin 94, as shown in FIG. 5, and it allows an operator of the hook to pull against the spring bias to release locking pin from a notch and the allow arm-portion to be moved relative to the load-bearing portion into a position in the open configuration. An external surface of the actuator 20 is provided with an outer gripping surface in the form of ribs 21 to allow a user to gain a purchase on the actuator 20. Depression on one side of the actuator 20 against the spring bias, for example by the thumb of an operator, causes movement of the locking pin 94.

In this example, the first and second shafts 30, 34 and the actuator 20 form an assembly of separable components, but in other embodiments the locking pin 94 is formed as a one-piece unit.

Figure 3:
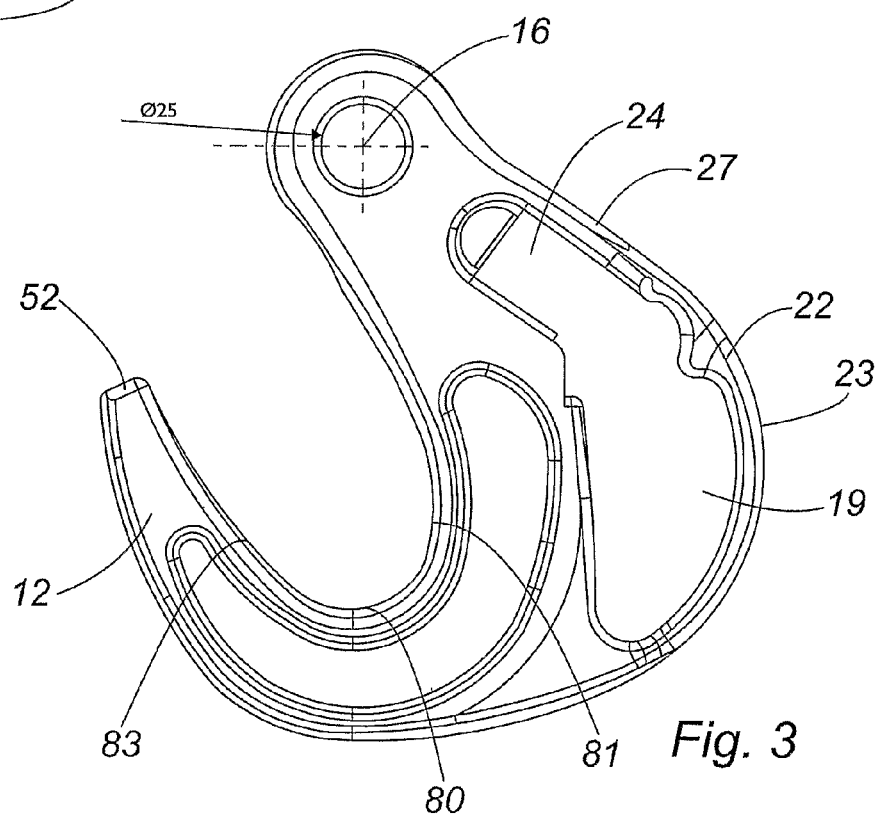
FIG. 3 is a side view of a handle and a load-bearing portion of the FIG. 1 hook.
Figure 6:
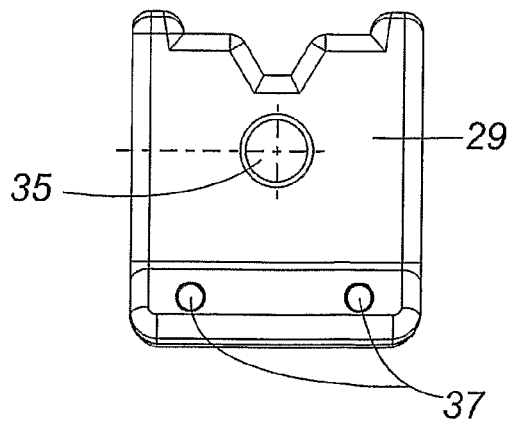
FIGS. 6 and 7 are plan and side views respectively of an end stop for the locking mechanism of the FIG. 1 hook.
Figure 7:
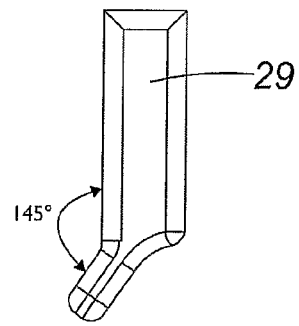
Figure 8:
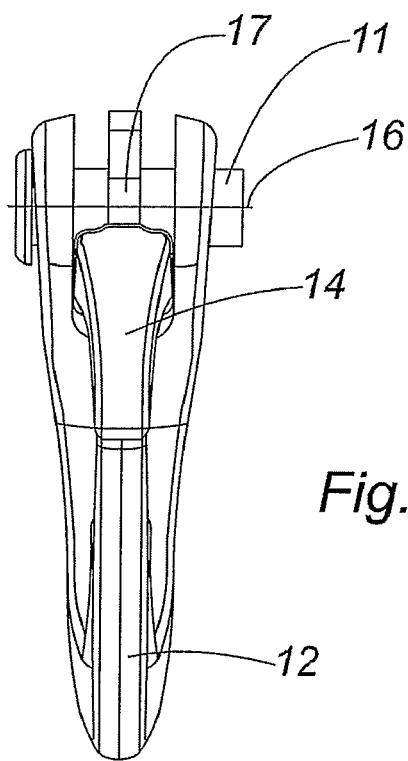
FIGS. 8 and 9 are front and side views respectively of the arm portion coupled to the load-bearing portion.

A handle portion 22 extends from an outer surface of the load-bearing portion 12, and is shaped in an upper region to define a void 24 for receiving the locking pin 94 and spring 32 assembly (see e.g. FIG. 3). The handle portion 22 defines an area or aperture 19 in which the user can access the actuator 20 to operate the locking device 90 of the hook 10. The actuator 20 and locking pin 94 are mounted and held in position in this region via the end stop 29 of FIGS. 6 and 7.

The end stop 29 has two apertures 37 extending therethrough that allow the end stop 29 and locking pin 94 to be mounted within the void 24 of the handle 22 by means of screws 38 (shown in FIG. 12) which secure the end stop 29 to the load-bearing portion 12. At the opposing edge, the end stop 29 is profiled to interlock the stop 29 to the handle 22. The end stop 29 has a centrally disposed circular slot 35 for receiving an end of the shaft 30, for allowing sliding movement of the actuator and locking pin 94. The slot 35 retains the end of the shaft 30 so that the shaft 30 is held in position but in sliding relation thereto.

The handle portion 22 curves smoothly over the top of the void region 24 and provides protection for the locking mechanism 90, in particular the locking pin 94. In addition, the locking pin 94 is fitted within the void 24 of the handle 22 such that the actuator 20 does not protrude beyond the outer surface 27 of the handle 22. Furthermore, the locking pin 94 is actuated by a sliding the actuator with thumb and forefinger in the plane of the hook main face 41. Since the actuator 20 fits within the outer profile of the handle 22 in this manner, there are no sharp edges that could scratch an operator and a much lower risk that skin will be trapped during actuation of the actuator 20. This arrangement also reduces the risk of accidental actuation of the actuator 20, and of unlocking the hook.

Additionally, the fact that the actuator 20 is located in the space defined by the handle portion 22 is advantageous since the operator is using the actuator 20 in an area that is spaced from the eye 18 of the hook 10 thereby reducing the likelihood of pinch and trap injuries.

In addition, the handle portion 22 itself is an integral one-piece construction with the load-bearing portion 12 attaching to the load-bearing portion 12 near its top and bottom ends in use. It forms a smooth continuous outer boundary surface 23 which merges smoothly with outer boundary surfaces of the load bearing portion at upper and lower ends of the hook. The handle defines an aperture or loop 19 separate from the region of the eye 18 of the hook allowing an operator to place fingers through the aperture and grip the handle portion 22 firmly, safely away from the hook opening. The actuator 20 is positioned in the recess/void 24 at the upper part of the aperture 19 so that it can be thumb operated whilst gripping the handle portion. In other embodiments, the area of the aperture 19 and/or void 24 is recessed in relation to an outer surface of the hook, and may replace a throughgoing aperture such as that the aperture 19. The void/24 may be a recess of the load-bearing portion 12.

In other examples, other variants to the tops of the suspension portion 74 may be used instead of the eyelet 70 for attaching the hook to the connecting chain or wire, although the yoke 72 configuration at the other end of the suspension portion remains in the same form. The different types of suspension portions therefore remain pivotable relative to both the arm portion 14 and the load-bearing portion 12 in the same manner as previously described. These variants can include swivel top and clevis top suspension portions. Clevis top suspension portions are typically preferred where the top is to be attached to a connecting chain. Ring top/eyelet and swivel tops are typically suspended from a wire, with swivel top suspension portions being especially useful where a load will be suspended from a long crane wire, particularly in offshore applications. The swivel top suspension portion allows a twisted wire to dissipate its torque by rotation of the swivel bearing and without rotation of the load, which could otherwise be dangerous.

Figure 10:
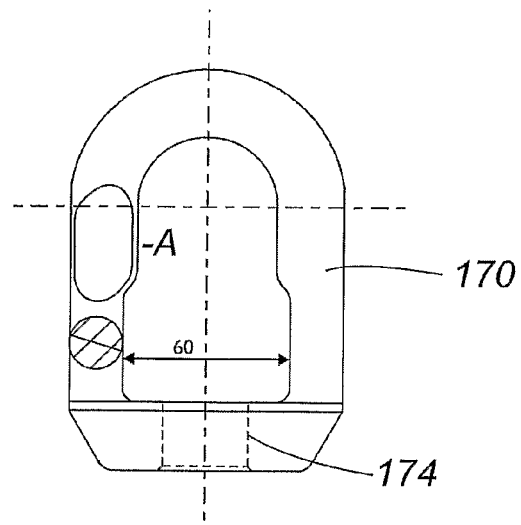
FIG. 10 is a side view of an alternative eyelet that could be used with the FIG. 1 hook.

An alternative suspension portion 174 in the form of a swivel top suspension portion is shown in FIGS. 10-12. The suspension portion 174 provides an eyelet 170 that is rotatable relative to the load-bearing portion 12 and the arm portion 14. The eyelet 170 has a threaded internal portion 174 to allow a threaded portion 173 of the suspension portion 174 to be fixed thereto. A neck 115 extends from the threaded portion 173 into a swivel bearing 175. The swivel bearing 175 is also attached to a lower yoke 172 within which the annular part 17 of the arm portion 14 can be located. The swivel bearing 175 allows relative rotation of the eyelet 170 and the yoke 172 that is rigidly connected by bolting to the arm portion 14 and the load-bearing portion 12 in the manner previously described.

In order to move the load-bearing portion 12 with respect to the arm portion 14 into the open position and lock it there, the arm portion 14 and the suspension portion 74 are configured to interengage with each other so that the arm portion 14 is forced and held against the suspension portion 74 by gravity whilst the load-bearing portion is being rotated on lifting the handle upward in the general direction of the suspension portion, i.e., from the position of FIG. 14 to the position of FIG. 15. To do this, the arm-portion 14 has an abutment surface 13 upstanding radially from the outer circumference of the annular part 17 of the arm portion. The surface is positioned at approximately 135° around the circumference from the first notch 58 in the direction toward notch 59. The suspension portion 74 has a second abutment surface 79 arranged to abut the first abutment surface 13 of the arm 14. For purposes of illustration, this relationship can be seen in further detail in embodiments of the swivel top variant 170 as depicted in FIGS. 10 to 12, in which the suspension portion 174 is provided with an internal step 178 in a slot 180 in the yoke 172 into which the arm portion is fitted on assembly. This step 178 defines the second abutment surface 179 to engage the first abutment surface 13 of the arm and prevent the arm 14 from moving past. The second abutment surface 179 faces the direction of movement of the arm portion 14 relative to the suspension portion 174 about the pin 11, as may be governed by gravity in use, and abuts against the first abutment surface 13 of the arm portion to thereby prevent the arm portion 14 from dropping out of position rotationally around the pin 11 when the load-bearing portion 12 is moved by an operator. The yoke 72 of the suspension portion 74 of embodiments previously described is configured in the same way.

This arrangement eliminates any need otherwise for an operator to hold the arm portion in one hand while the load-bearing portion is moved with the other. It allows the hook to be moved to and locked safely in the open configuratioin by one-armed control of the load-bearing portion 12 by holding and manipulating the handle 22.

Referring to FIG. 3, part of an inner surface of the load-bearing portion 12 is shaped to have the greatest or tightest radius of curvature to form a load-bearing area 80. A part 81 of the inner surface on one side of the load-bearing area 80 towards the pivotal connection between the arm portion 14 and load-bearing portion 12, is shaped to have the steepest sides and the lowest radius of curvature. The steep sides on the part 81 of the inner surface ensure that loads are urged toward the load-bearing area 80. Part of the inner surface 83 on the other side of the load-bearing area 80 toward the free end of the load-bearing portion 12 has relatively steep sides (to direct a load toward the load-bearing area 80 in use) and a radius of curvature that gradually increases toward the load-bearing area 80. This gentle increase in the radius of curvature of part 83 of the inner surface of the load-bearing portion 12 facilitates insertion and removal of loads from the hook 10.

Figure 17:
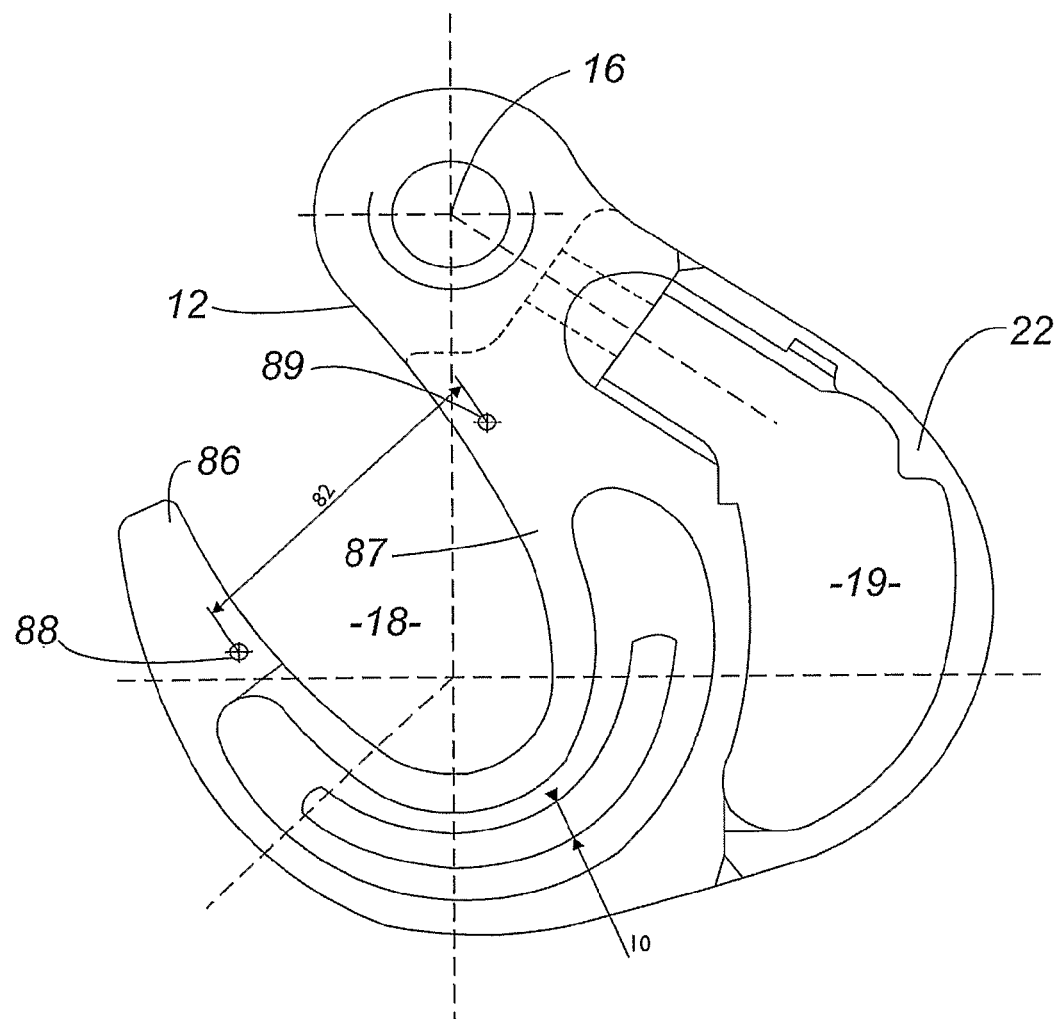
FIG. 17 is a side view of the load-bearing portion of the hook of FIG. 1 showing strain measurement nipples.

Turning to FIG. 17, the load-bearing portion 12 of the hook 10 is further provided with test nipples 88,89 positioned on sides 86,87 of the load-bearing portion either side of the eye 18 of the hook 10. The nipples 88,89 are spaced a pre-determined distance apart, and are used to detect and gauge strain or fatigue in the hook after it has been used. This is achieved by measuring the distance between the nipples 88,89, for example using a calliper device, after use and comparing it with the known distance between the nipples originally. If the distance is greater after use than before, this indicates that the hook has deformed during use, and may need to be replaced. This is a further safety feature of the hook.

In use, the general lifting hook 10 can be used in conjunction with a crane for lifting heavy loads. The hook 10 in this example is rated to carry loads of up to 8 tonnes. The lifting hook 10 is coupled to crane using a 25 mm connecting wire which is fed through the eyelet 70 and is attached to the master link of the main crane hook a safe distance above the work area. The hook 10 is thus suspended and a longitudinal axis of the connecting wire defines a longitudinal axis 41 of the hook 10, which axes tend to be oriented substantially vertically under the influence of gravity. The crane and therefore the attached hook 10 is then moved into the desired position such that the hook 10 is in the region of the load to be transported. An operator in the work area guides the hook 10 towards the load using the handle portion 22 to control the motion of the hook 10. The handle 22 allows the operator to gain a purchase on the hook 10 without requiring the operator to locate their fingers near or within the eye 18.

Typically, the hook is initially locked in the closed configuration and suspended in equilibrium, as shown in FIG. 14. The hook 10 is locked in the closed configuration since the tapered end 36 of the locking pin 94 locates in the second notch 58, and the sides of the notch 58 present an impediment to restrict movement of the locking pin 94 out of the notch 58 and in turn restricts relative rotation of the arm portion 14 and the load-bearing portion 12. The locking pin end 36 is biased into the notch 58 under the force of the tension spring 32.

In order then to attach a load, the operator must move the hook 10 into an open configuration in which the load-bearing portion 12 and the arm portion 14 no longer define a continuous boundary so that the eye can be accessed and a load can be attached through the hook eye 18. This is achieved by an operator placing the palm of their hand around the handle 22 and placing a thumb and/or a forefinger on opposing sides of the actuator 20 to depress the actuator 20 against the bias of the tension spring 32 in order to slide and retract the leading end 36 of the locking pin 94 away from the annular end 17 of the arm portion 14 so that the tapered leading end 36 of the shaft 34 moves out of engagement with the second notch 58. The operator's thumb and forefinger are restricted from slipping from the actuator 20 by the ribbed finger holds 21. This action unlocks the load-bearing portion 12 from the arm portion 14 and allows the load-bearing portion 12 to be pivoted relative to the arm portion 14 about the pin 11. The tapered leading end 36 of the pin 94 is free to be moved around the outer part 63 of the arm portion 14 thereby permitting relative pivotal movement of the load-bearing portion 12 and the arm portion 14.

Still holding the handle with one hand, the operator lifts the handle against the weight of the wire and other equipment suspended from the crane above (including the suspension portion of the hook), thereby moving the load-bearing portion and locking pin 94 around the pivot axis relative to the suspension portion. As this is carried out, the arm portion 14 is acted on by gravity and will want to tend to rotate from its start position in FIG. 14, in the same sense as the load-bearing portion to some equilibrium position more or less aligned with the longitudinal axis 41. However, the arm portion is prevented from rotating substantially away from the starting position shown in FIG. 14 due to the abutment of the first and second abutment surfaces 13, 79 (or 13,179 in other examples described above) of the respective arm portion 14 and suspension portion 74 which retains the arm portion 14 from moving past the suspension portion 74. Thus, the action of lifting the handle with one hand also moves the load-bearing portion 12 relative to the arm portion 14, and the end faces 54, 52 of the arm portion 14 and the load-bearing portion 12 respectively move apart and out of alignment and provide an opening through which the load can be attached to and detached from the load-bearing portion 12 of the hook 10. The load-bearing portion 12 is pivotable in the unlocked position until the next locking position is reached around 65° from the second notch 58.

After the unlocking the hook and having begun moving the load-bearing around the arm portion end 17, the actuator may be released, and the spring will push the shaft 34 against the smooth circumferential surface 63 of the arm portion end 17 between locking positions (see also FIG. 4), but still permitting the rotation of the load-bearing portion.

Figure 16:
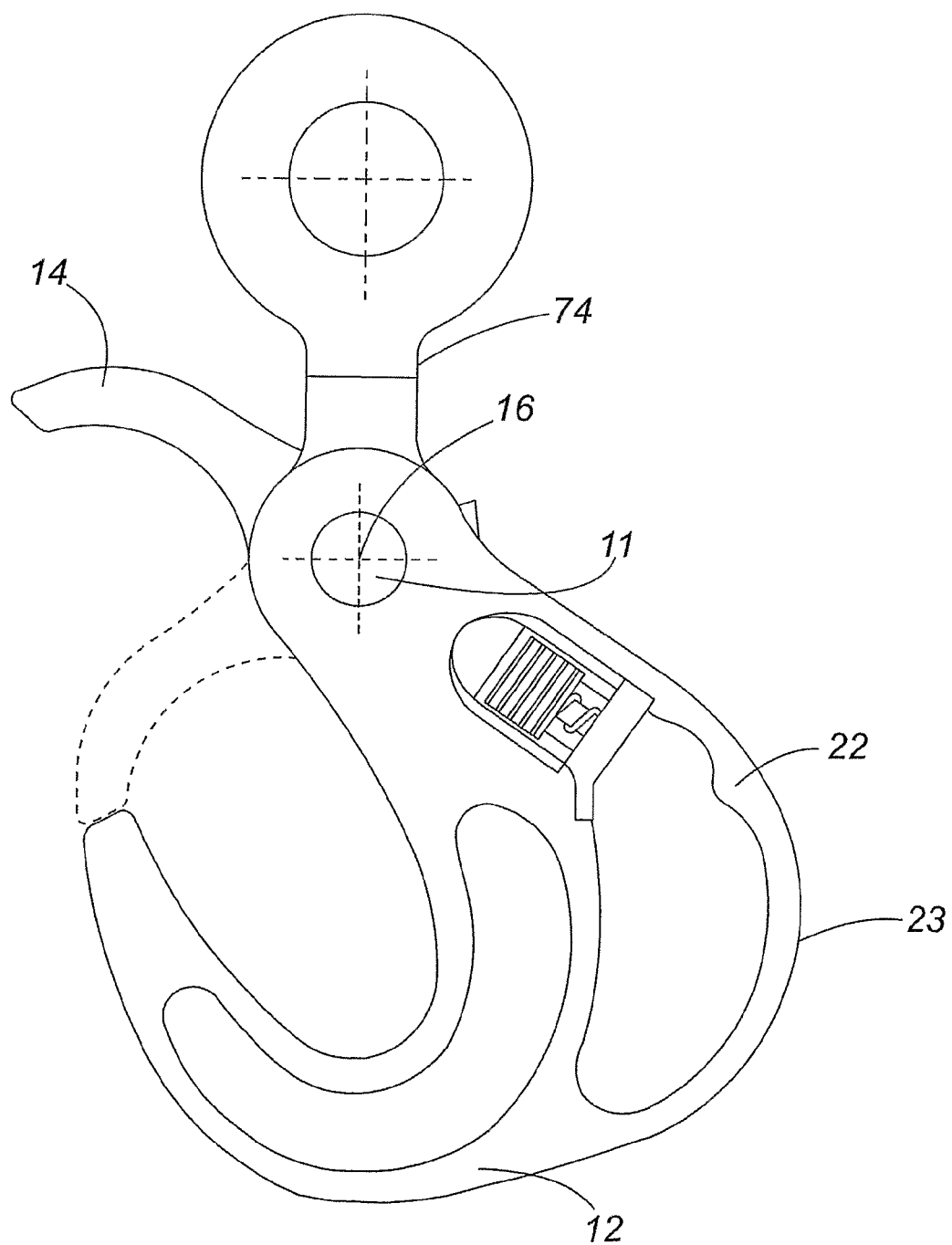
FIG. 16 is a side view of the FIG. 1 hook in a locked open configuration showing the load-bearing and arm portions are pivotable in the locked position relative to a suspension portion.

In an unlocked, open position it may be possible to attach certain loads, but typically it is preferable to lock it in the open position as seen in FIG. 15. To do this, the operator continues to lift the load-bearing portion 12 relative to the arm portion 14 (and the suspension portion) using the handle 22 and until the leading end 36 of the shaft 34 approaches the location of the first notch 59. At this point, the leading end 36 of the locking pin 94 of the locking mechanism 90 will click into the first notch 59 to retain the load-bearing portion 12 and the arm portion 14 in the open configuration as shown in FIG. 15. The handle may then be released by the operator altogether and since the suspension portion 74 is independently pivotable relative to the locked arm portion 14 and load-bearing portion 12, the locked arm 14 and load-bearing 12 portions will together pivot under gravity to a loading position as shown in FIG. 16. The pivot and swivel of the suspension portion allows the hook to be manipulated in the vertical and horizontal planes, and the operator can also use the handle 22 to manipulate the hook into the optimum position for attaching and detaching a load from the load-bearing portion 12.

A load 40, with the hook suspended in equilibrium in FIG. 16, is then attached and secured to the load-bearing portion 12 through the eye 18. The load is urged into the load-bearing area 80 on the inner surface of the load-bearing portion 12. If the load 40 is not already seated in the load-bearing area 80, the part 83 having a gradually increasing radius of curvature or the steep sided part 81 urges the load 40 towards the load-bearing area 80. As a result, the load 40 in the load-bearing area 80 aligns with the longitudinal axis 41 of the hook 10 that coincides with the longitudinal axis of the wire from which the hook 10 is suspended. As shown in FIG. 12, the load 40 is urged towards the central, longitudinal axis 41 of the hook 10 and the load 40 is located in the load-bearing area 80 without significant tilting of the load-bearing portion 12 being required.

The load 40 is typically secured before engaging the crane to hoist the load away from the work area. When the operator wishes to secure the load on the load-bearing portion 12 of the hook 10, in the position of FIG. 16, the operator again places a thumb and forefinger on the ribbed portion 21 of the actuator 20 to depress the pin 94 against its bias and move the tapered end 36 out of the second notch 59. Thus, relative movement of the arm portion 14 and the load-bearing portion 12 is enabled. In this rotational position, the first and second abutment surfaces are no longer in abutment permitting a certain arc of rotational travel of the arm portion relative to the load-bearing portion. By unlocking the hook in this position therefore, the arm portion 14 pivots due to gravity relative to and towards the load-bearing portion 12, to close the opening and return the hook to the closed configuration where again the tapered end 36 of the pin 94 is urged into the second notch 58 under the action of the tension spring 32, thereby locking the hook in the closed configuration and securing the load.

The present operation may be carried out similarly to allow access to the hook eye to remove the load from the hook.

The invention provides a number of advantages. In particular, the hook 10 can be locked in both the closed and the open configuration, since the biasing of the second part of the locking pin 94 towards the arm portion 14 urges the leading end 36 of the pin 94 into one of the notches 58, 59. This is a safer arrangement for loading and unloading the hook 10, since the hook 10 can be locked in the open configuration, leaving the operator two free hands to locate chains or tabs to the load-bearing portion. Loading and unloading the hook 10 is greatly facilitated by the gradually increasing radius of curvature of part 83 of the inner surface of the load-bearing portion 12 towards the load-bearing area 80.

Provision of the separate handle portion 22 allows the operator to modify the relative positions of the arm portion 14 and the load-bearing portion 12 one-handed while gripping the handle portion 22 and without having to move one or more fingers into or near the eye 18 of the hook 10 thereby significantly reducing the likelihood of pinch or trap injuries. This is aided in part by locating the locking mechanism so that it is operable along an axis perpendicular to the pivot axis 16 such that the actuator 20 function is remote and separate from the load-bearing portion 12, the arm portion 14 and the eye 18.

These safety features in turn make the hook particularly advantageous for use in the offshore oil and gas industry for lifting equipment on or off floating vessels and installations which may be moving around during operations due to the effects of the sea, improving safety in difficult handling conditions.

Another benefit is that the handle and in turn the load-bearing portion need only be rotated about the pin 11 by an angle of 60° in order to allow a load to slide off the eye following the gradual contours of the surfaces of the load-bearing portion 12. This allows disengagement of a load while avoiding significant and potentially damaging "jumping" effects which are known to occur as a load is removed from conventional hooks.

Modifications and improvements can be made without departing from the scope of the present invention. For example, the handle portion 22 could be formed as a separable component rather than being integral to the load-bearing portion.

In particular, it will be appreciated that the hook could be used in a horizontal configuration. In this configuration, gravity would not be acting sufficiently to move the arm portion 14 from the open position shown in FIG. 16 to the closed configuration in the embodiments described above.

In order to remain a one-handed operation in a horizontal mode, the hook may be modified to include a closure mechanism (not shown), for example using a spring, that actuates to move the arm portion 14 from its position in the open configuration to close it against the load-bearing portion 12 as the actuator 20 is operated to move the locking pin 94 out of the notch 59.

In addition, the length of the pin 94 can be altered. For example, it may be desirable to increase the length of the pin 94 to space the actuator 20 further from other moving parts of the hook 10. This may be a safer working position for an operator. The length of the tension spring 32 and the number of coils can be varied to improve the strength according to the application. Spacers or washers can be added to the pin 30 to modify the length of the tension spring 32 and therefore the force with which the load-bearing portion 12 is biased towards the arm portion 14 and the force that must be applied by an operator to urge the spring 32 against its bias. Further notches 58, 59 can be provided in the annular end 17 of the arm portion 14 to allow the hook 10 to occupy different locked positions.

In the embodiments described above, the pin 11 is a floating pin and is free to rotate with respect to either of the arm portion, load-bearing portion or suspension portion whilst keeping these components aligned and coupled in relation to each other. However, in other embodiments the pin 11 itself may be secured or fixed to one of the arm, load-bearing or suspension portions if desirable.

In addition, it will be appreciated that although the above description refers specifically to the hook being used with a crane, it may be used with other lifting devices, for example a winch. The hook described in the examples above may be a general lifting hook.

The invention claimed is:

1. A hook comprising:
a) a load bearing portion including a main body portion and a handle portion defining an aperture therebetween, wherein the aperture includes a lock recess bounded by a face of the main body portion and a face of the handle portion, and at least one of the face of the main body portion and the face of the handle portion supports a trapezoid guide adapted to slidably engage a trapezoid groove formed in a face of a slidably mounted actuator;
b) an arm portion pivotally coupled to the load-bearing portion, such that the arm portion is pivotable relative to the load-bearing portion between a closed configuration, in which the load-bearing portion and the arm portion together define a substantially continuous boundary, and an open configuration, in which the arm portion and the load-bearing portion together define a discontinuous boundary;
c) a side-mounted locking mechanism, comprising a lock slide mechanism including the slidably mounted actuator, wherein the slidably mounted actuator is adapted to lock the arm portion with respect to the load-bearing portion in the open configuration of the hook, and
wherein the lock slide mechanism is contained within the lock recess of the aperture between the main body portion and the handle portion of the load bearing portion by an end stop plate such that the lock recess of the aperture is a separate region from a second portion of the aperture between the main body portion and the handle portion of the load bearing portion.

2. A hook as claimed in claim 1, wherein the locking mechanism is adapted to lock the arm portion with respect to the load-bearing portion in the closed configuration or in a plurality of different open positions of the open configuration of the hook.

3. A hook as claimed in claim 1, wherein the hook has a suspension portion from which the hook is suspended in use; and the suspension portion is pivotally coupled to the load-bearing portion or the arm portion and the load bearing portion; and the arm portion, the load-bearing portion and the suspension portion are aligned on a common pivot axis, and are each adapted to be rotated about the pivot axis wherein the pivot axis is substantially perpendicular to a longitudinal axis of the hook.

4. A hook as claimed in claim 3, wherein the arm portion, the load-bearing portion and the suspension portion are independently pivotable with respect to each other; and wherein, in use, the arm portion and the load-bearing portion pivot together relative to the suspension portion when the arm portion is locked with respect to the load-bearing portion; and wherein the suspension portion has a first part that is pivotally coupled to the arm portion and the load-bearing portion, and a second part that is rotatable relative to the first part; and wherein the second part is adapted to swivel axially relative to the first part about a longitudinal axis of the suspension portion.

5. A hook as claimed in claim 1, wherein the locking mechanism has a locking device arranged to selectively adopt a locked position, in which the arm portion is restrained from movement relative to the load-bearing portion, and an unlocked position, in which the arm portion is free to pivot relative to the load-bearing portion, wherein the hook is provided with an actuator to move the locking device between the locked and unlocked positions, and wherein the locking mechanism has first and second selectively interengagable locking parts for retaining the locking device in the locked or unlocked positions.

6. A hook as claimed in claim 1, wherein the arm portion and the load-bearing portion define a first aperture adapted to receive a connecting load tab or chain therethrough.

7. A hook as claimed in claim 6, wherein the hook includes a handle connected to the load-bearing portion, and a second aperture is defined between the handle and the load bearing portion, wherein the second aperture is separate from the first aperture; wherein the handle is integral with the load-bearing portion and has a curved outer surface that forms a smooth join with an outer surface of the load-bearing portion.

8. A hook as claimed in claim 6, wherein the hook includes a recessed region separate from the first aperture of the hook, wherein the recessed region is defined between a portion of the handle and a portion of the load bearing portion; and wherein an actuator is located in the recessed region of the hook, the actuator being selectively operable by a user to activate the locking mechanism and thereby lock the arm portion with respect to the load-bearing portion.

9. A hook as claimed in claim 8, wherein the inner surface of the load-bearing portion has greatest curvature in the load-bearing area.

10. A hook as claimed in claim 1, wherein the load-bearing portion is pivotable into a loading orientation in the open configuration where an inner surface of the load-bearing portion is presented at an angle to facilitate urging a load toward a load-bearing area of the load-bearing portion, the load bearing area aligned with a longitudinal axis of the hook in use, and wherein the inner surface of the load-bearing portion is shaped to locate the load in the load-bearing area.

11. A hook as claimed in claim 8, wherein the inner surface defines opposed side portions extending substantially in parallel from near the load-bearing area to near the arm portion of the hook, and wherein the inner surface has a gently increasing curvature toward the load-bearing area to facilitate insertion and removal of loads from the hook.

12. A hook as claimed in claim 1, wherein the lock slide is symmetrical about its longitudinal vertical centreline wherein the lock slide is the integrated lock actuator, and wherein the lock slide provides dual actuator grips such that the lock slide can be actuated from either side of the hook, that is by either right- or left-handed operators.

13. A hook as claimed in claim 1, wherein the lock slide and actuator is positioned within a lock recess such that the actuator is operated by the extended thumb when holding the hook handle with the fingers, or wherein the lock slide is contained within a separate lock recess and does not extend to the second aperture which is the handle space.

14. A hook as claimed in claim 1, wherein the second aperture, which is the handle space, is free of any lock mechanisms, pin extensions, trigger or actuating devices and any moving components.

15. A hook as claimed in claim 1, wherein the lock slide protrusion, which is adapted to fit into at least one recess to lock the hook in a closed and/or open position, is provided with tapered ends such that the tapered fit forces the ends of locking arm and the load bearing hook end together in the closed position and wherein the configuration of the lock slide, including its integral thumb operated lock actuator, and the separate hook handle for which the positioning of these elements provides an rotational operation to open and or close the hook.

* * * * *